July 7, 1959     E. E. AYLOR     2,893,661
AIRPLANE STRUCTURE
Filed Dec. 27, 1954     2 Sheets-Sheet 1
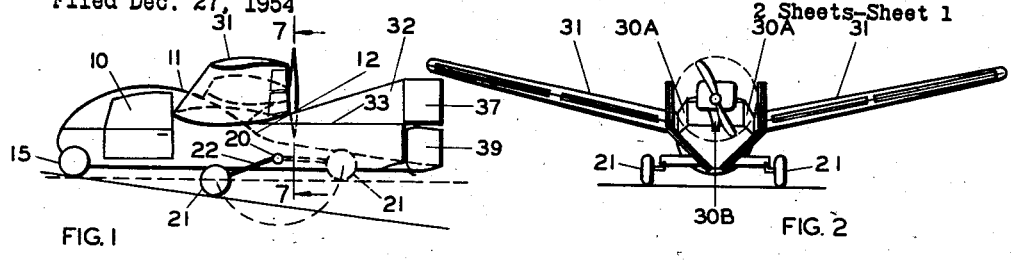
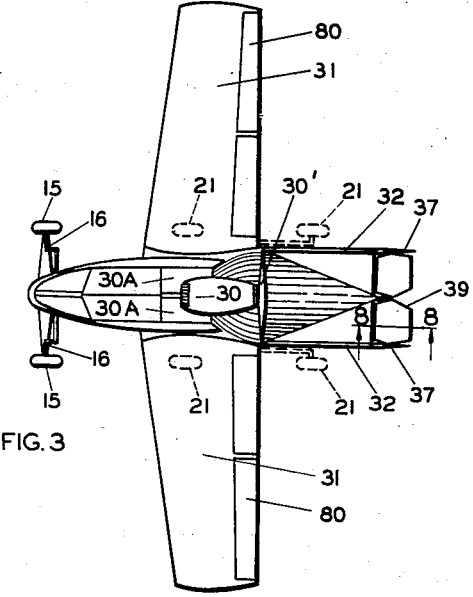
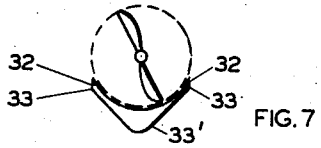
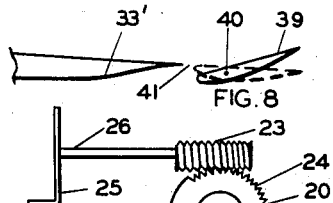
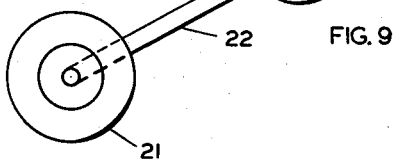
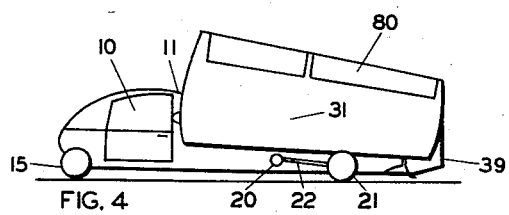
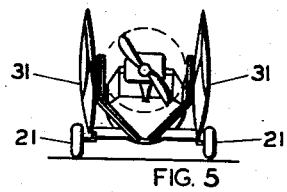
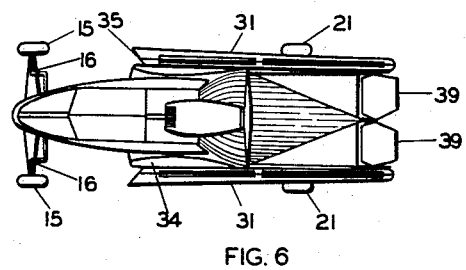
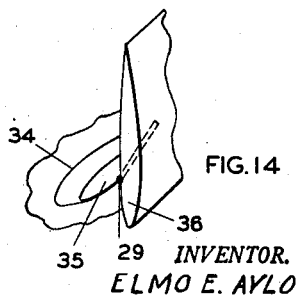
INVENTOR.
ELMO E. AYLOR
BY
J. D. Douglas July 7, 1959  E. E. AYLOR  2,893,661
AIRPLANE STRUCTURE
Filed Dec. 27, 1954  2 Sheets-Sheet 2
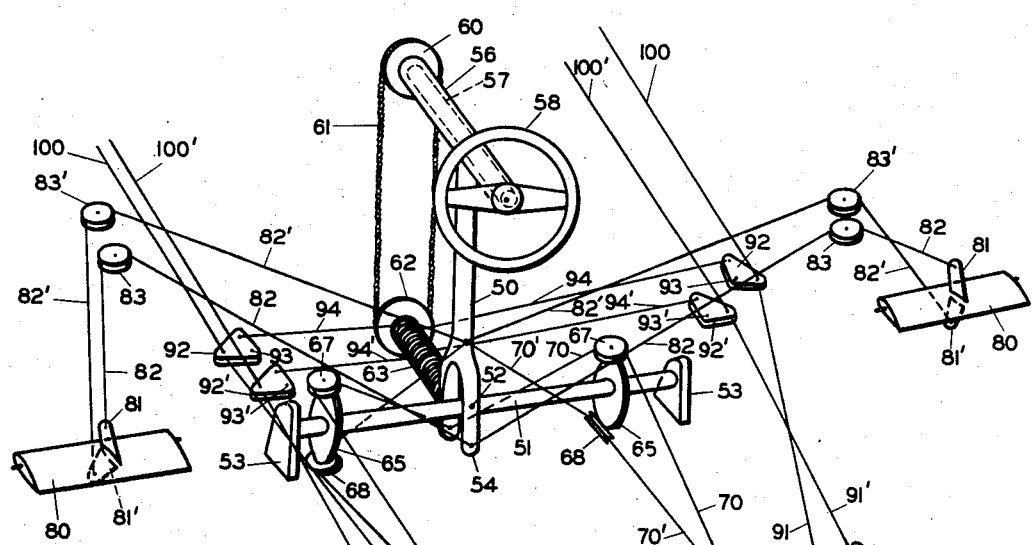
FIG. 10
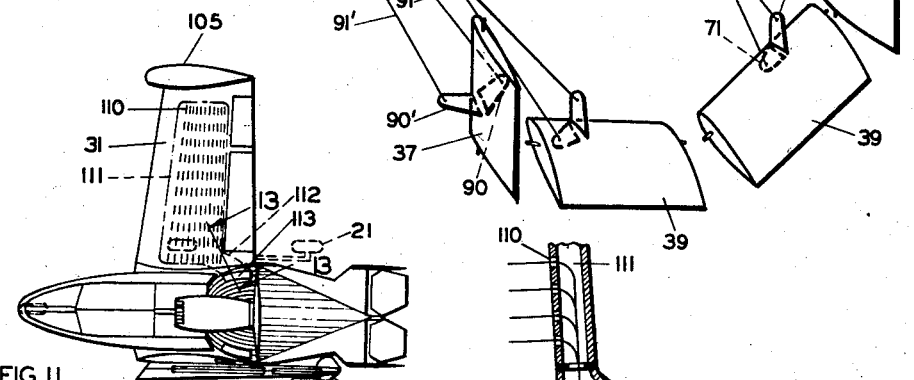
FIG. 11
FIG. 12
FIG. 13
INVENTOR.
ELMO E. AYLOR
BY
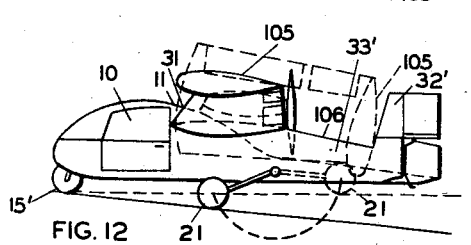

United States Patent Office 2,893,661
Patented July 7, 1959

2,893,661

AIRPLANE STRUCTURE

Elmo E. Aylor, Galesburg, Ill.

Application December 27, 1954, Serial No. 477,685

11 Claims. (Cl. 244—36)

This invention relates to improvements in airplanes and more particularly to an improved airplane structure which lends itself to the production of a combined airplane and automobile, commonly known as airmobiles.

Although airmobiles have been designed prior to the present invention there have been many disadvantages to previous designs which the present invention largely overcomes. Heretofore the wings and propeller have been removed, when such a device was used as a road vehicle. This required a place to store the removed parts and also additional heavy transmission gearing for operating the device as a road vehicle. By the present invention the wings are folded back into a position where they afford additional protection for the propeller. Inasmuch as the propeller is the means for moving the vehicle, heavy transmissions are eliminated. This decreases the weight and enables the user to land at one airport, drive the plane to a desired spot and to then take off at another airport without the necessity of returning to the original landing spot to pick up the wings.

A particular advantage of my improved structure resides in a design which while enhancing the adaptability to its use as a road vehicle provides an aerodynamic improvement over existing structures.

An object of my invention is to provide a fuselage which has aerodynamic lift.

Another object of my invention is to provide a fuselage which provides protection for the propeller and where the design is such as to increase the effectiveness of the propeller.

Another object of my invention is to provide a "pusher" type of construction wherein the design of the fuselage and the position of the propeller is such that a low pressure area is created back of the high point of the fuselage decreasing the tendency toward the creation of a burble point particularly at low or stalling speeds, thus decreasing the landing speed.

Another object of the invention is to provide a fuselage structure the under surface of which is continuous and provides a positive angle of attack reducing the tendency of the air to burble along the bottom.

Another object of the invention is to provide a fuselage structure which aerodynamically cooperates with the propeller blast to provide a smooth transmission or movement of air preventing burble and has less undesirable effects on the controls.

Another object of my invention is to provide a structure which effectively operates to remove the boundary layer of air from the wing surfaces.

Another object of my invention is to provide a system of coordinated controls which may be operated in a normal manner to provide full automatic coordination and which may also be operated without any change, in the manner of uncoordinated controls, to provide cross controls that enable side slipping and other maneuvers to be performed, which could not otherwise be performed.

Another object of my invention is to provide an improved positioning of the elevator control surfaces which cooperates with the fuselage structure at a high angle of attack to provide an aerodynamic slot that keeps the elevators effective at all times due to positive pressure.

Still other objects of the invention and the invention itself will become more apparent from reference to the description which is illustrated by the accompnaying drawings and which forms a part of the present specification.

In the drawings:

Fig. 1 is a side elevational view of an airplane constructed according to my invention, conditioned for flying, with certain otherwise hidden parts thereof shown by dashed lines and illustrating in dashed lines the alternative position taken by the landing gear.

Fig. 2 is a rear elevational view thereof.

Fig. 3 is a plan view thereof.

Figs. 4, 5 and 6 are similar views to Figs. 1, 2 and 3 with the wings and landing gear shown in a non-flying position.

Fig. 7 is a section taken on the lines 7—7 of Fig. 1.

Fig. 8 is a diagrammatic view showing the operation of the elevators.

Fig. 9 is a diagrammatic view of the landing gear control.

Fig. 10 is a view in perspective illustrating the control surfaces and the controls therefor.

Fig. 11 is a plan view of a modified structure showing one wing folded and the other extended to flying position.

Fig. 12 is a side elevational view showing in dashed lines, the folded position of the wings.

Fig. 13 is a fragmentary section taken along the line 13—13 of Fig. 11.

Fig. 14 is a fragmentary perspective view illustrating the manner in which the wing is secured to the fuselage.

Throughout the drawings, like parts have been designated by like reference characters.

Briefly, my invention contemplates an airplane with a fuselage having a front to rear aerodynamic conformation that provides increased lift and wherein the fuselage provides a guide for the air flow increasing the efficiency of the propeller. The wings may be folded back out of the vision of the operator and at the same time the landing gear may be adjusted to an alternate position to provide for greater stability on take-off or as a road vehicle.

A system of coordination controls is provided, which may be operated in a manner similar to a conventional airplane when desired, to increase the maneuverability.

As shown in Fig. 1, there is provided a fuselage, the forward front portion of which provides a cabin enclosure having a door 10 which may be opened to admit and discharge passengers. As viewed from the side, it will be seen that the fuselage has an airfoil conformation the top being provided with a predetermined camber 11 which, toward the rear curves downward at 12 to a thin section in a manner such that a good lift is provided.

The front of the vehicle is provided with a pair of wheels 15 which are spaced apart and supported on steering knuckles 16. The spacing apart of the wheels is such as to assure lateral cornering stability when used as a road vehicle.

At approximately the mid-point of the vehicle there is provided a rotatable support 20 for the rear wheels 21. The rear wheels are carried on the ends of arms 22 which are connected rigidly to the support 20. The support 20 is rotatable so that the wheels may be pivoted from the position shown in Fig. 1 to that shown in Fig. 4, this being effected by any suitable mechanism and which may include a worm 23 and worm gear segment 24, the worm being rotatable by a motor or a hand crank 25 connected to a shaft 26 as illustrated in Fig. 9.

As can best be seen from Fig. 1, when the rear wheels are in flying position they are well forward of the center of the fuselage, but not of the center of gravity. In this position, they are sufficiently close to the center of gravity however, that during the takeoff the elevator may tilt the airplane on the rear wheels so that the nose may be raised to place the airplane at the proper angle of attack for takeoff.

On the other hand, it can be seen that when the wheels are in the rear position, they are well back of the center of gravity and in such a position that the vehicle is level and has greater front to rear stability on the road due to the long wheelbase. It is preferable that the arm 22 be of somewhat flexible nature for absorbtion of road as well as landing shocks. It will be appreciated that this flexibility may be realized from the support 20 which may act as a torsion or shock absorber bar that may twist on opposite sides of the worm wheel 24.

As can be seen, the power plant is of the pusher type, the engine being supported by a nacelle 30 with the propeller 30' operating immediately to the rear of the main wings 31. The nacelle is in turn supported by struts 30a and 30b. It will be appreciated however that the propeller may be operated by an engine supported from another point and connected to the propeller by a shaft or other means.

The fuselage, back of the cabin, dips in a downward direction as indicated at 12 and the sides of the fuselage are formed to provide upstanding fins 32 that continue backward on substantially straight vertical planes which are defined by a line 3. The upper edge of the vertical parallel fins inclines upwardly toward the rear. Thus vertical fins are provided on opposite sides which are of right triangular formation as viewed from the side with the high part of the tail end. A pair of rudders 37 are connected to the rear ends of the fins. From the line 33 the sides incline inwardly and downwardly toward each other to form a substantially 90° V-shaped bottom 33' on the underside of the fuselage. The upper side is preferably spaced from the bottom outside to provide a trough or semi-tunnel shaped enclosure which gradually increases in depth from the fuselage and propeller to the tail section.

As can be seen in Fig. 1, the propeller operates partially in this trough which has a rising characteristic toward the rear, the extremity being of a height to be above the axis of the propeller shaft. The shape of these two surfaces is best shown in Fig. 7. This semi-circular contour gradually merges with the substantially 90° V-shaped bottom and terminates at the rear in the V-shaped bottom above which are parallel sides formed by the vertical fins.

The movable rudders 37 which are hinged to the fins at the rear thus are substantially extensions of the vertical fin surfaces. The extreme ends of the V have elevators 39 disposed in parallel alignment therewith.

Fig. 8 illustrates most clearly in diagrammatical section that these elevators are pivoted at 40 spaced from the fuselage with their axis of rotation parallel to the trailing edge of the fuselage. As the elevators are rotated to raise the trailing edge, a differential action is realized because the front edges drop below the trailing edge of the fuselage to provide a slot 41 through which air may flow from the underside of the fuselage. This causes the controls to remain effective at very high angles of attack. The V-shaped placement of the elevators also provides a modified rudder action, when they are interconnected with the ailerons, enabling coordinated turns to be made without the use of the usual rudder control.

As can be seen, the propeller being immediately to the rear of the fuselage at the place where it dips downward draws the air over the top of the fuselage, which, because of the airfoil shape of the fuselage, gives it lift. The placement of the propeller at the dip also prevents the formation of burbles at the dip thus decreasing the landing and stalling speeds. Furthermore the propeller being substantially in alignment with the trailing edges of the wings, when in flight position, the air entering the propeller must come from the space above the fuselage and the wing roots which causes a suction action that decreases the burble point and other turbulence increasing the lift and decreasing the drag. The wing down wash which begins at the plane of the rotation of the propeller can get air only from the top side of the wing and fuselage and being shielded is not subject to the down wash as is common in conventional pusher structures. Furthermore the guiding effect of the fuselage on the air provides an unobstructed path for the propeller blast which has a directional stabilizing influence on the control surfaces.

It should be pointed out at this time, the airfoil contour of the fuselage which contributes to the lift of the airplane permits maintaining the thrust line within reasonable distance from the drag line.

The sides and bottom with their confining influence on the propeller blast causes a concentration thereof which increases the effectiveness of the controls.

The forward underside of the fuselage has a smooth rounded contour, which, at approximately the mid-point between the forward and rear ends of the airplane blends with a V-shaped bottom contour which continues to the rear. The angle of incidence of the wing relative to the keel line of the V should be 0° or at least small enough to allow the V surface to be from 0° to some positive angles of attack at all times during normal operation. This reduces the drag on the underside at a positive angle of attack providing a laminar flow and at the same time the V-shaped portion provides directional and longitudinal stabilizing influences.

It will be noted that since the door is ahead of the wing, persons entering the plane while the engine is running, cannot walk into the propeller and that there is no disturbing effect due to the propeller blast.

In Fig. 10, there is shown a perspective diagrammatic view of the controls and control surfaces. In this illustration there is shown the control gear which includes the column 50 having a forked lower end 54 that is pivoted for lateral movement on an elevator control cross member 51 at 52. The ends 54 of the fork extend below the member 51. The member 51 is journalled for rotation in end supports 53. The pivot 52 extends through the fork and the member 51, whereby the member 51 can be rotated by forward and backward tilting of the column 50. The upper end of the column 50 supports a tube 56 in which a shaft 57 is rotatably journalled and carries a hand wheel 58 at one end and a sprocket 60 or sheave at the far end. A chain 61 is engaged with the sprocket 60 and also with a lower sprocket 62 carried on the end of a drum 63 which extends outward from the fork 54 in alignment with the pivot 52.

The column is thus capable of a forward and rearward tilting movement as well as a lateral or sidewise tilting movement and the handwheel may be turned.

A forward or rearward tilting movement of the column rotates the shaft 51 which carries vertical cross members 65, near the ends. Each of the cross members carries a sheave 67 and 68 at the ends. Elevator control cables 70 and 70' are provided, these cables being connected to cantilevers 71 and 71' fixedly secured to the elevators 39. These cables are then trained over the sheaves 67 and 68 respectively with the ends of the cables 70 being connected to the lower end of the forward fork and the cables 70' being connected to the column at a point equally spaced from the pivot 52.

As can be seen, if the column is tilted forward or rearward the elevators are lowered or raised because of the swinging action of the cross members 65, and that also a differential movement is realized if the column is moved laterally.

The ailerons 80 are connected by cables to the column 50 in a similar manner, being provided with cantilevers 81 and 81' to which are connected cables 82 and 82', the cable ends 82 being connected to the lower end 54 of the fork and the cables 82' being connected equidistant from the lower cable to the column above the fork, sheaves 83 and 83' are provided being secured in a fixed position and over which the respective cables are trained.

It will be apparent that straight forward and rearward tilting movement has no effect on the ailerons because the cables 82' and 82 are connected to the column equidistant from its pivotal axis.

As stated however, the column may tilt sidewise about the pivot 52 and when it is so moved the cables 82' and 70' are moved in one direction and the cables 70 and 82 in the other direction. Thus if column is tilted the ailerons and elevators are moved in opposite direction. Since along with the ailerons the elevators are at a V-shaped angle they are in position for providing automatic coordinated turns and banks.

The rudders 37 also have cantilevers 90 and 90' extending from opposite sides to which are connected the cables 91 and 91'. These cables are connected to pivoted members which may be bell crank levers 92 and 92' which have fixed pivots 93 and 93'. The other ends of the bell cranks have cables 94 and 94' connected thereto and these cables are attached to the drum 63 so that they wind and unwind from the drum in opposite directions. Thus if the hand wheel is rotated the movement is transmitted to the drum and the rudders are swung in the same direction. This enables the yaw of the airplane to be controlled, and, as will be apparent, when desired, enables the airplane to be sideslipped.

The rudder control bell crank levers also have attached thereto cables 100 and 100' which are connected to the steering knuckles which permits steering of the vehicle when on the ground in a manner similar to an automobile. If desired, these cables could be connected to valves to provide full power steering.

As previously stated, the wing may be folded from a flying position to a folded position where the device operates as a road vehicle. To enable this action the fuselage is provided with a wing seat boss 34, Fig. 6, which projects outwardly slightly from the fuselage and has wing seat surfaces 35 extending from front to rear parallel to the center line of the fuselage. This seat however is inclined from the vertical at an angle which may be 45° to the vertical. The wing is provided with a corresponding surface 36. A pivot pin is provided about which the wing may be pivoted, when unlocked. This includes a main pivot 29 which, in relation to the fuselage, slopes downward, inward and forward. This enables the wing tips to be grasped and swung rearward toward the tail section, at the same time the normally horizontal surface of the wing is rotated so that it attains a vertical position whereby the wing becomes parallel to the fuselage.

In Figs. 11 to 13, I have shown slight modifications of the structure which constitutes a modification of the fuselage enabling the use of wing tanks and also illustrates how the structure lends itself to the elimination of the boundary layer. Furthermore, a tricycle landing gear is illustrated.

If desired, wing tanks 105 may be provided on the ends of the wings. As is well known, these tanks have a desirable aerodynamic effect on the wing tips. In order to enable the wings to be folded back, and to prevent them from protruding too far from the side it may be desirable to modify the formation of the fuselage which can readily be effected by eliminating the forward part of the fins 32 and providing a downward and rearward slant to the upper edges of the V-shaped bottom 33' as shown at 106. Beyond the pivot where the extremity of the wing is positioned in the folded position is a modified vertical fin 32'.

It may also be desirable to use a single steerable wheel 15' on the front. As previously mentioned, the structure lends itself peculiarly to the efficient elimination of the boundary layer. In carrying this out the upper wing surfaces may be provided with one or more longitudinal extending spaced slots which are connected by a manifold to a port that opens slightly ahead of the propeller. Preferably the upper surface is provided with a multiplicity of fine slots 110 which open into a header or manifold 111 disposed below the slots. This manifold is connected by a duct 112 which opens through a port 113 just ahead of the propeller.

It will be apparent that because the propeller is operating directly to the rear of the port, that a suction is created in the manifold which is transmitted to the slots eliminating the boundary layer on top of the wing and materially increasing the lift.

It will thus be seen I have provided a structure which enables all the objects of the invention recited to be carried out. An aerodynamically improved structure is realized and one where the safety factor as a road vehicle is improved. The system of controls greatly simplifies the control of the machine as an aircraft with coordinated controls which can be easily manipulated to provide the control realized in the conventional airplane increasing the maneuverability over that of the coordinated control type.

Of particular interest is the fact that the airfoil shape of the fuselage, together with the confining effects of the trough in which the propeller operates, increases the stability in flight and provides an efficient means of eliminating the boundary layer, increasing the stall angle and decreasing the landing speed whereby the device may land and take off in relative small fields.

Although I have described the bottom as having a V shape it will be appreciated that the bottom could take the same shape as the upper surface of the trough and the advantages of the trough in combination with the placement of the propeller relative to the airfoil shape of the fuselage still be realized.

Furthermore, although the above is described as being useful in connection with a combined airplane and road vehicle it will be apparent that its usefulness is not limited to that combination since it could be used in airplanes that are not convertible to road vehicle.

Having thus described my invention I am aware that numerous and extensive departures may be made from the structure shown without departing from the spirit of the invention as defined in the appended claims.

I claim:

1. A combined airplane and road vehicle comprising a fuselage, the forward portion of said fuselage being formed as an airfoil having a high camber, a driven propeller disposed to the rear of the point of the fuselage having the highest camber, said fuselage being provided with rearwardly extending fins the upper edges of which are spaced from the center line of the vehicle and substantially parallel, a curved surface extending from said fins downward and forming a keel, said propeller operating partially within the confines of said fins and the upper surface of said keel.

2. An airplane as defined in claim 1 where the upper edges of the fins gradually incline upward toward the rear.

3. An airplane as defined in claim 1 where the fins define flat vertical planes and where the fins and upper surface of the keel form a trough for training the propeller blast therebetween.

4. An airplane as defined in claim 3 where said trough is semi-cylindrical and extends forward of said propeller and merges with said airfoil section.

5. An airplane as defined in claim 4, where the propeller operates in said trough rearward of said airfoil section and the blade tips of the propeller revolve in close proximity to the upper surface of said trough.

6. A combined airplane and road vehicle comprising a fuselage including a cambered surface having aerodynamic lift, an engine nacelle with an engine and a pusher propeller thereon secured to said fuselage to the rear of said cambered portion, said fuselage having rearward and upwardly extending side portions in spaced apart relation to each other and bottom portions connected to said side portions which incline downward to a horizontal center line, said sides and bottom forming a trough shaped structure which terminates in the rear in flat vertical side planes and angularly disposed bottom planes, rudders secured to said side planes in alignment therewith and elevators secured to said bottom planes in alignment therewith.

7. An airplane as described in claim 6 where the pivot line for the elevators is spaced from the leading edge whereby when they are moved the leading edge extends below the plane of the bottom of the fuselage and cooperates therewith to form aerodynamic slots for cooperation with the relative wind.

8. An airplane comprising a fuselage and wings on opposite sides thereof, a rearwardly extending portion for said fuselage defining a trough, a driven propeller of the pusher type disposed in the forward end of said trough the rear of said trough comprising vertical spaced side surfaces and a V-shaped bottom surface, rudders in prolongation of said side surfaces and elevators in prolongation of said V surfaces, ailerons on said wings, a control column mounted for forward, rearward and sideward tilting movement, and means connecting said column to said elevators and said ailerons the points of connection for the ailerons and elevators being the same to provide for coordination of said controls.

9. An airplane including a fuselage and a power plant carried thereby and having a propeller connected thereto, said fuselage being formed in the shape of an airfoil with a portion having a high lift characteristic and having a portion to the rear formed to provide rearwardly extending guiding surfaces providing a guiding surface for air currents from the propeller and to seal off air currents from entering the propeller from under the fuselage and wings, wings extending laterally from the fuselage, said propeller being disposed to the rear of the high lift portion and pulling air over the high lift portion and directing it into said air guiding portion.

10. An airplane as described in claim 9, wherein said wings are formed to provide a plurality of openings in the upper surface thereof and said air guiding portion being formed to provide a port ahead of said propeller and duct means connecting said port to said openings in said wing.

11. An airplane as defined in claim 10 where said openings in said wing surface are distributed longitudinally thereof and to the rear of the highest camber point.

References Cited in the file of this patent

UNITED STATES PATENTS

| | | |
|---|---|---|
| 1,891,354 | Leray | Dec. 20, 1932 |
| 1,957,413 | Price | May 1, 1934 |
| 2,158,776 | Rabe | May 16, 1939 |
| 2,272,522 | Hojnowski | Feb. 10, 1942 |
| 2,494,547 | Fish | Jan. 17, 1950 |
| 2,609,167 | Gero | Sept. 2, 1952 |
| 2,674,422 | Pellarini | Apr. 6, 1954 |
| 2,713,465 | Novinger | July 19, 1955 |

FOREIGN PATENTS

| | | |
|---|---|---|
| 166,746 | Austria | Sept. 11, 1950 |
| 412,472 | France | July 13, 1910 |
| 951,902 | France | Apr. 25, 1949 |